United States Patent
Janakiraman et al.

(10) Patent No.: US 11,645,695 B2
(45) Date of Patent: May 9, 2023

(54) COMPUTING PERSONALIZED RECOMMENDATIONS BY MODELING INTERACTIONS AS A BIPARTITE GRAPH

(71) Applicant: Intuit Inc., Mountain View, CA (US)

(72) Inventors: Vijay Manikandan Janakiraman, San Jose, CA (US); Arjun Sripathy, Mountain View, CA (US)

(73) Assignee: Intuit Inc., Mountain View, CA (US)

( * ) Notice: Subject to any disclaimer, the term of this patent is extended or adjusted under 35 U.S.C. 154(b) by 564 days.

(21) Appl. No.: 16/817,380

(22) Filed: Mar. 12, 2020

(65) Prior Publication Data

US 2021/0287273 A1 Sep. 16, 2021

(51) Int. Cl.
| | | |
|---|---|---|
| *G06Q 30/00* | (2023.01) | |
| *G06Q 30/0601* | (2023.01) | |
| *G06N 5/045* | (2023.01) | |
| *G06F 17/16* | (2006.01) | |
| *G06N 20/00* | (2019.01) | |

(52) U.S. Cl.
CPC ......... *G06Q 30/0631* (2013.01); *G06F 17/16* (2013.01); *G06N 5/045* (2013.01); *G06N 20/00* (2019.01); *G06Q 30/0623* (2013.01)

(58) Field of Classification Search
CPC ......... G06Q 30/06–08; G06Q 30/0631; G06Q 30/0623; G06N 20/00; G06N 5/045; G06F 17/16
See application file for complete search history.

(56) References Cited

U.S. PATENT DOCUMENTS

2014/0317033 A1* 10/2014 Mojsilovic ............... G06N 5/02
706/17
2015/0193854 A1* 7/2015 Huang ................. G06T 11/206
705/26.7

OTHER PUBLICATIONS

Optimizing Parallel Collaborative Filtering Approaches for Improving Recommendation Systems Performance, Christos Sardianos, Grigorios Ballas Papadatos, and Iraklis Varlamis, Apr. 26, 2019 (Year: 2019).*

Maximizing Aggregate Recommendation Diversity: A Graph-Theoretic Approach, Gediminas Adomavicius, YoungOK Kwon, Oct. 23, 2011 (Year: 2011).*

X. He, M. Gao, M.-Y. Kan, and D. Wang, "Birank: Towards ranking on bipartite graphs," IEEE Transactions on Knowledge and Data Engineering, vol. 29, No. 1, pp. 57-71, Aug. 15, 2017.

* cited by examiner

*Primary Examiner* — Ethan D Civan
(74) *Attorney, Agent, or Firm* — Ferguson Braswell Fraser Kubasta PC (57) ABSTRACT

A method may include obtaining interactions between users and items, and calculating, for each edge in a bipartite graph, an edge weight using an inverse of the degree of a user node connected to the edge and an inverse of the degree of an item node connected to the edge. The bipartite graph includes user nodes corresponding to the users and item nodes corresponding to the items. The method may further include identifying paths each including an edge connecting the target user node and a common item node, an edge connecting a neighboring user node and the common item node, and an edge connecting the neighboring user node and a neighboring item node. The method may further include calculating, using the edge weights calculated for the edges, scores for the paths, and recommending, to the target user and using the scores for the paths, a recommended item.

20 Claims, 7 Drawing Sheets

COMPUTING PERSONALIZED RECOMMENDATIONS BY MODELING INTERACTIONS AS A BIPARTITE GRAPH

BACKGROUND

Recommendation systems based on collaborative filtering algorithms suffer from popularity bias where popular items are disproportionately recommended and/or the interactions of highly active users are over-represented. Collaborative filtering approaches typically build a model from a user's past behavior as well as similar decisions made by other users. In addition, it is challenging for recommendation systems based on graph algorithms to generate useful explanations for recommendations.

SUMMARY

This summary is provided to introduce a selection of concepts that are further described below in the detailed description. This summary is not intended to identify key or essential features of the claimed subject matter, nor is it intended to be used as an aid in limiting the scope of the claimed subject matter.

In general, in one aspect, one or more embodiments relate to a method including obtaining interactions between users and items. The users include a target user. The method further includes calculating, for each edge in a bipartite graph, an edge weight using an inverse of the degree of a user node connected to the edge and an inverse of the degree of an item node connected to the edge. The bipartite graph includes user nodes corresponding to the users and item nodes corresponding to the items. The user nodes include a target user node corresponding to the target user. The method further includes identifying, in the bipartite graph, paths each including an edge connecting the target user node and a common item node, an edge connecting a neighboring user node and the common item node, and an edge connecting the neighboring user node and a neighboring item node. The target user node is not directly connected to the neighboring item node by a single edge. The method further includes calculating, using the edge weights calculated for the edges, scores for the paths, and recommending, to the target user and using the scores for the paths, a recommended item.

In general, in one aspect, one or more embodiments relate to a system including a computer processor and a repository storing interactions between users and items. The users include a target user. The repository further stores a bipartite graph including user nodes corresponding to the users, item nodes corresponding to the items, and edges each connecting a user node and an item node. The user nodes include a target user node corresponding to the target user. The system further includes a recommendation engine executing on the computer processor and configured to calculate, for each edge, an edge weight using an inverse of the degree of a user node connected to the edge and an inverse of the degree of an item node connected to the edge, and identify, in the bipartite graph, paths each including an edge connecting the target user node and a common item node, an edge connecting a neighboring user node and the common item node, and an edge connecting the neighboring user node and a neighboring item node. The target user node is not directly connected to the neighboring item node by a single edge. The recommendation engine is further configured to calculate, using the edge weights calculated for the edges, scores for the paths, and recommend, to the target user and using the scores for the paths, a recommended item.

In general, in one aspect, one or more embodiments relate to a method including obtaining interactions between users and items. The users include a target user. The method further includes calculating, for each edge in a bipartite graph, an edge weight using an inverse of the degree of a user node connected to the edge and an inverse of the degree of an item node connected to the edge. The bipartite graph includes user nodes corresponding to the users and item nodes corresponding to the items. The user nodes include a target user node corresponding to the target user. The method further includes identifying, in the bipartite graph, paths each including an edge connecting the target user node and a common item node, an edge connecting a neighboring user node and the common item node, and an edge connecting the neighboring user node and a neighboring item node. The target user node is not directly connected to the neighboring item node by a single edge. The method further includes calculating, using the edge weights calculated for the edges, scores for the paths by multiplying a matrix, a transpose of the matrix, and the matrix. The matrix includes a row of cells corresponding to the user nodes. The matrix includes a column of cells corresponding to the item nodes. Each cell of the matrix includes the edge weight calculated for the edge connecting the user node corresponding to the cell and the item node corresponding to the cell. The method further includes recommending, to the target user and using the scores for the paths, a recommended item.

Other aspects of the invention will be apparent from the following description and the appended claims.

DETAILED DESCRIPTION

Specific embodiments of the invention will now be described in detail with reference to the accompanying figures. Like elements in the various figures are denoted by like reference numerals for consistency.

In the following detailed description of embodiments of the invention, numerous specific details are set forth in order to provide a more thorough understanding of the invention. However, it will be apparent to one of ordinary skill in the art that the invention may be practiced without these specific details. In other instances, well-known features have not been described in detail to avoid unnecessarily complicating the description.

Throughout the application, ordinal numbers (e.g., first, second, third, etc.) may be used as an adjective for an element (i.e., any noun in the application). The use of ordinal numbers is not to imply or create any particular ordering of the elements nor to limit any element to being only a single element unless expressly disclosed, such as by the use of the terms "before", "after", "single", and other such terminology. Rather, the use of ordinal numbers is to distinguish between the elements. By way of an example, a first element is distinct from a second element, and the first element may encompass more than one element and succeed (or precede) the second element in an ordering of elements.

In general, embodiments of the invention are directed to recommending an item to a target user. For example, an item may be an object (e.g., a product or a service) to be purchased, or a merchant from whom an object is purchased. The recommendation may be based on scores calculated for paths through a bipartite graph that represents interactions between users and items. A bipartite graph is a graph whose nodes may be divided into two disjoint sets (e.g., user nodes and item nodes) such that each edge connects a node in one set to a node in the other set. Edge weights may be calculated for the edges in a path to de-emphasize bias corresponding to popular items and/or influential users (e.g., users who interact with many items). For example, an edge weight may be de-biased by multiplying by the inverse of the degree of the user node connected to the edge and/or the inverse of the degree of the item node connected to the edge. The degree of a node is the number of edges connected to the node, and thus may be a measure of the popularity of an item and/or the activity of a user. The path scores may be calculated efficiently using matrix multiplication techniques. The recommendation may further be based on similarities among user features and/or item features. An explanation may be generated for the recommendation based on interior nodes included in the paths between the target user and the recommended item. For example, the explanation may list common items corresponding to interior nodes that both the target user and other users interacted with. Continuing this example, the contribution of each common item to the recommendation may be quantified. A machine learning model may be trained to learn a nonlinear scoring function used to score the paths as well as learn how to use user and item features to influence the recommendation.

Figure 1A:
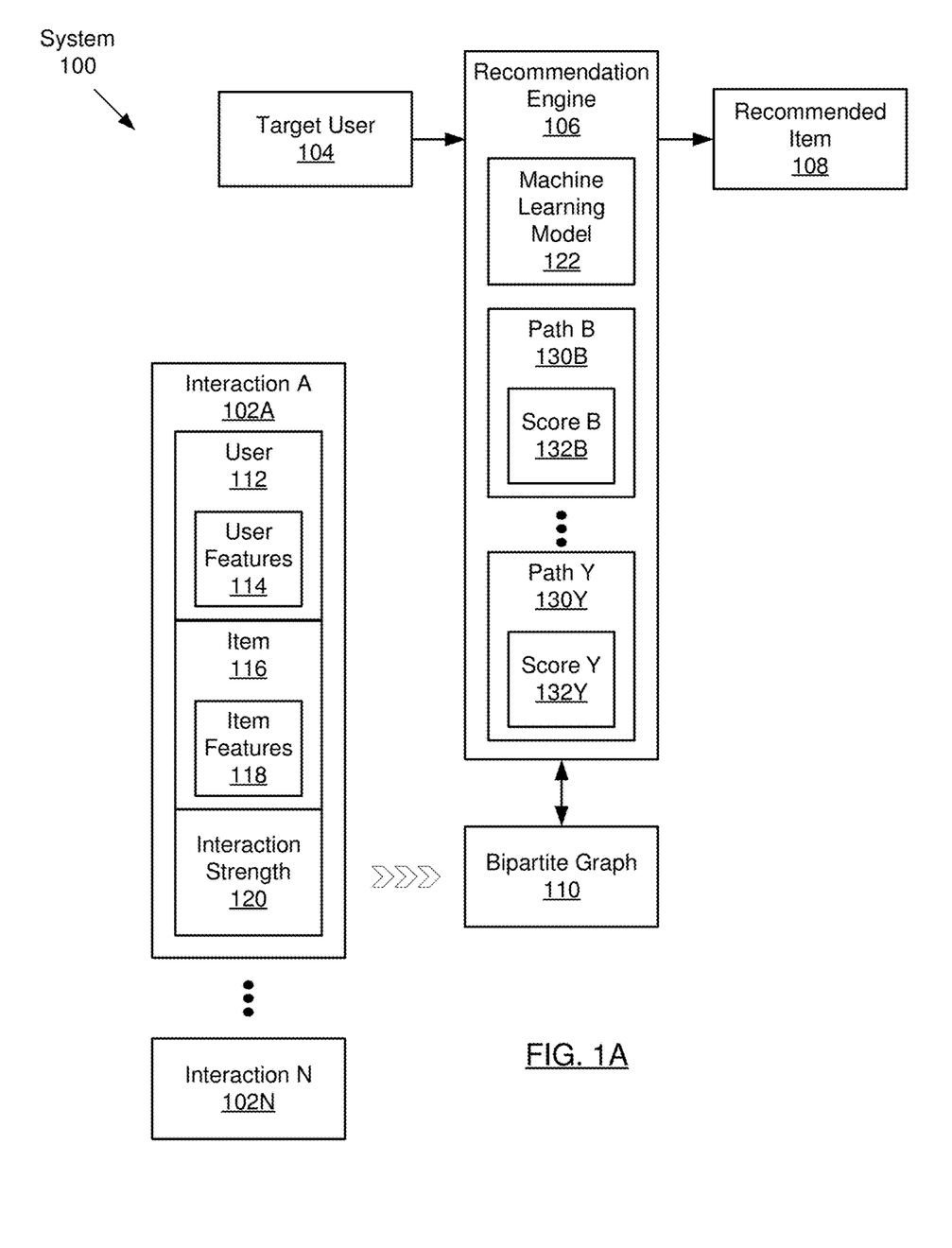
FIG. 1A and FIG. 1B show a system in accordance with one or more embodiments of the invention.

FIG. 1A shows a system (100) in accordance with one or more embodiments of the invention. As shown in FIG. 1A, the system (100) includes interactions (102A, 102N), a target user (104), a recommendation engine (106), a recommended item (108), and a bipartite graph (110). An interaction (102A) may be an action that involves two or more entities. In one or more embodiments, an interaction (102A) involves a user (112) applying an action on an item (116). For example, a user (112) may be an individual or a group (e.g., a business entity). An item (116) may be an entity to which the user applies an action. For example, an item (116) may be an object (e.g., a product or a service) to be purchased. Alternatively, an item (116) may be a merchant from whom an object is purchased. The interaction (102A) may include an interaction strength (120) whose value indicates the strength of the relationship between the user (112) and the item (116). For example, if the interaction (102A) represents a past decision of the user (112) to interact with the item (116), the interaction strength (120) may be 1. Continuing this example, the interaction (102A) may be a purchase of the item (116) by the user (112). Alternatively, the interaction (102A) may represent a rating of the item (116) by the user (112). For example, the rating may be a number in a numerical scale (e.g., a scale of 1-5).

In one or more embodiments, a target user (104) is a user (112) for whom the recommendation engine (106) generates a recommendation (e.g., the recommended item (108)). The target user (104) may communicate with the recommendation engine (106) via a graphical user interface (GUI) (not shown). For example, the recommendation engine (106) may include functionality to notify the target user (104) of the recommended item (108) via the GUI.

In one or more embodiments, a user (112) corresponds to one or more user features (114). User features (114) may be properties (e.g., attributes) that describe a user (112). Examples of user features (114) may include age, income level, location, etc. In one or more embodiments, an item (116) corresponds to one or more item features (118). Item features (118) may be properties that describe an item (116). Examples of item features (118) may include price, item category, etc.

In one or more embodiments, a user similarity metric is associated with each of the user features (114). A user similarity metric is a function that computes a numerical value indicative of how similar the value of a user feature for one user is to the value of a user feature for another user. For example, the value of the user feature may be a raw value, such as an age of 67, or an age range, such as 60-70. In one or more embodiments, the user similarity metric is based on the difference between the values of the user feature corresponding to each user. In one or more embodiments of the invention, each user similarity metric may be assigned a weight indicating the relative importance of the corresponding user feature. In one or more embodiments of the invention, user similarity metrics may be combined (e.g., linearly) into an overall user similarity metric using the weights corresponding to each user similarity metric. Further, an item similarity metric may be associated with each of the item features (118). An item similarity metric is a function that computes a numerical value indicative of how similar the value of an item feature for one item is to the value of an item feature for another item.

Figure 1B:
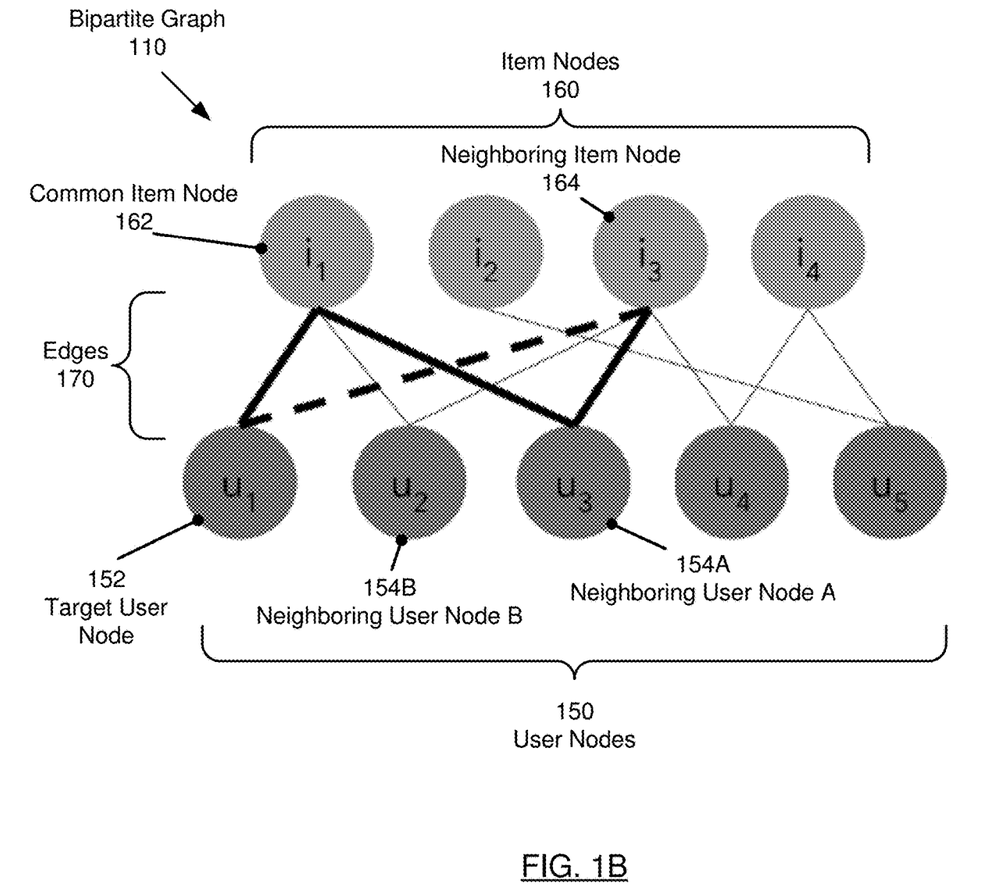

The bipartite graph (110) is a graph whose nodes may be divided into two disjoint sets (e.g., user nodes (150) and item nodes (160) of FIG. 1B) such that each edge connects a node in one set to a node in the other set. Turning to FIG. 1B, in one or more embodiments, the bipartite graph (110) includes user nodes (150), item nodes (160), and edges (170). Each user node (150) corresponds to a user (112). Each item node (160) corresponds to an item (116). Each edge (170) connects a user node (150) and an item node (160). Each edge (170) may correspond to an interaction (102A) between the user (112) corresponding to the user node (150) and the item (116) corresponding to the item node (160). Each edge (170) may correspond to an edge weight. For example, the edge weight may be based, in part, on the interaction strength (120) of the interaction (102A) corresponding to the edge (170).

The number of edges (170) connected to a node (e.g., a user node or an item node) is referred to as the degree of the node. The degree of the node may be thought of as a measure of the popularity of the node. For example, an item node corresponding to a popular item may be connected by edges to many user nodes. Similarly, a user node corresponding to a popular (e.g., influential) user may be connected by edges to many item nodes.

In one or more embodiments, a path is a series of connected edges in the bipartite graph (110) between a user node/item node pair such that there is no single edge that directly connects the user node to the item node. The nodes in the user node/item node pair are referred to as the endpoints of the path. Each endpoint is connected to exactly one edge in the path. In contrast, an interior point of a path is a node that is connected to more than one edge in the path. For example, FIG. 1B highlights a first path whose endpoints are a target user node (152) and a neighboring item node (164), where there is no edge that connects the target user node (152) to the neighboring item node (164). The target user node (152) may correspond to the target user (104) of FIG. 1A. The interior points of the first path shown in FIG. 1B are a common item node (162) and neighboring user node A (154A). The common item node (162) corresponds to a common item that both the target user and neighboring user A have interacted with. FIG. 1B further shows a second path whose endpoints are the target user node (152) and the neighboring item node (164). Continuing this example, the interior points of the second path shown in FIG. 1B are the common item node (162) and neighboring user node B (154B).

The absence of an edge connecting the target user node (152) and the neighboring item node (164) means that there is no interaction between the user corresponding to the target user node (152) and the item corresponding to the neighboring item node (164). However, the path represents a potential interaction, indicated by the dotted line in FIG. 1B, between the user corresponding to the target user node (152) and the item corresponding to the neighboring item node (164).

Returning to FIG. 1A, in one or more embodiments, the recommendation engine (106) is implemented in hardware (e.g., circuitry), software, firmware, and/or any combination thereof. In one or more embodiments, the recommendation engine (106) corresponds to the computing system (500) described with respect to FIG. 5A and the accompanying description below or corresponds to the client device (526) described with respect to FIG. 5B. The recommendation engine (106) may include functionality to calculate edge weights for edges (170) in the bipartite graph (110).

In one or more embodiments, the recommendation engine (106) includes functionality to calculate scores (132B, 132Y) for paths (130B, 130Y) in the bipartite graph (110). The recommendation engine (106) may include functionality to calculate a score (132B) for a path (130B) using the edge weights for the edges (170) included in the path (130B). In one or more embodiments, the recommendation engine (106) includes functionality to apply a machine learning model (122) to calculate scores (132B, 132Y) for paths (130B, 130Y). The machine learning model (122) may be implemented as a classifier. For example, the machine learning model (122) may classify an item as a best recommendation for a target user (104). The machine learning model (122) may be implemented as various types of deep learning classifiers such as a neural network classifier (e.g., based on convolutional neural networks (CNNs)), random forest classifier, stochastic gradient descent (SGD) classifier, lasso classifier, gradient boosting classifier, bagging classifier, adaptive boosting (AdaBoost) classifier, ridge classifier, elastic net classifier, or Nu Support Vector Regression (NuSVR) classifier. Deep learning, also known as deep structured learning or hierarchical learning, is part of a broader family of machine learning methods based on learning data representations, as opposed to task-specific algorithms. The machine learning model (122) may include functionality to calculate scores (132B, 132Y) for paths (130B, 130Y) via a nonlinear scoring function learned from training data. In one or more embodiments, the nonlinear scoring function is further based on user features (114) and/or item features (118) corresponding to the user nodes and/or item nodes included in the path (130B).

In one or more embodiments, the bipartite graph (110) and the interactions (102A, 102N) are stored in a repository. In one or more embodiments, the repository may be any type of storage unit and/or device (e.g., a file system, database, collection of tables, or any other storage mechanism) for storing data. Further, the repository may include multiple different storage units and/or devices. The multiple different storage units and/or devices may or may not be of the same type or located at the same physical site.

In one or more embodiments, the recommendation engine (106) includes functionality to combine scores for a subset of paths that share the same endpoints into an aggregate score for the user/item pair corresponding to the user node and the item node at the endpoints. The aggregate score may be thought of as a probability (e.g., a prediction) of a future interaction between the user of the user/item pair and the item of the user/item pair. For example, the recommendation engine (106) may calculate the aggregate score as the sum of the scores for each path between the user node and the item node at the shared endpoints. Alternatively, the recommendation engine (106) may include functionality to apply the machine learning model (122) to calculate the aggregate score. In one or more embodiments, the machine learning model (122) includes functionality to calculate the aggregate score using a nonlinear combining function learned from training data. In one or more embodiments, the machine learning model (122) is trained using target users and recommended items labeled as "correct" or "incorrect" depending on whether the target user acted on the recommendation (e.g., whether the target user subsequently interacted with the recommended item).

While FIG. 1A and FIG. 1B show a configuration of components, other configurations may be used without departing from the scope of the invention. For example, various components may be combined to create a single component. As another example, the functionality performed by a single component may be performed by two or more components.

Figure 2:
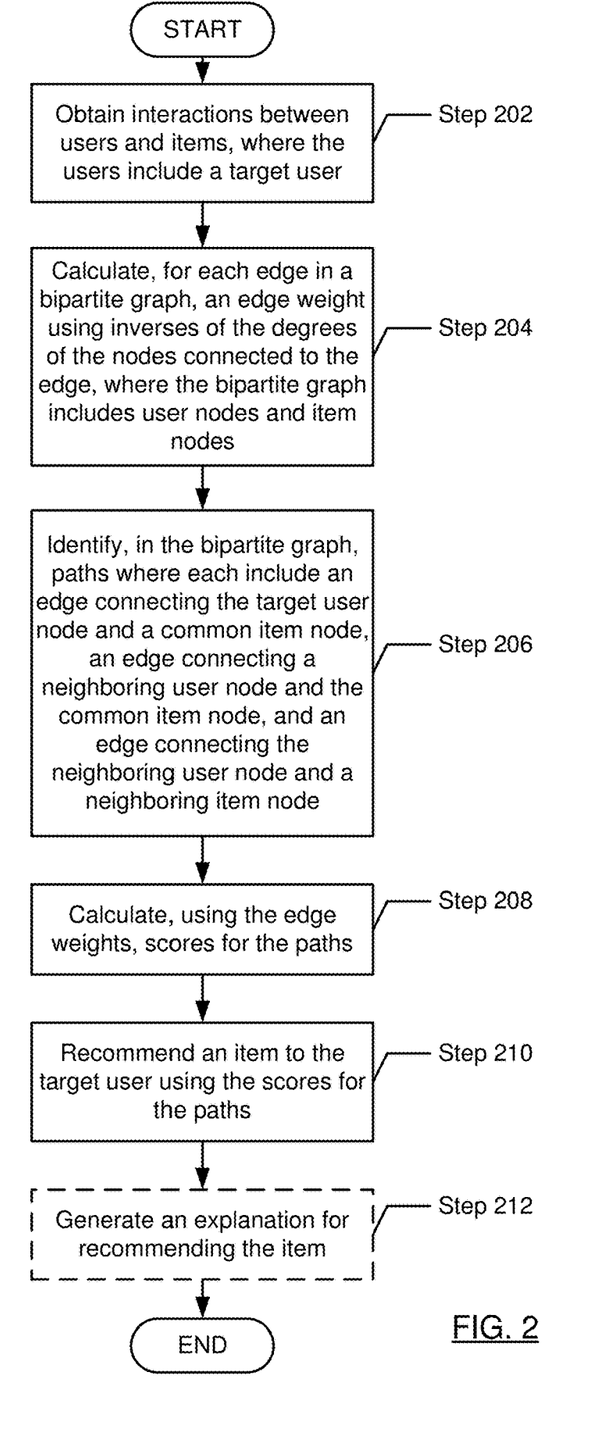
FIG. 2 shows a flowchart in accordance with one or more embodiments of the invention.

FIG. 2 shows a flowchart in accordance with one or more embodiments of the invention. The flowchart depicts a process for generating a recommendation. One or more of the steps in FIG. 2 may be performed by the components (e.g., the recommendation engine (106) of the system (100)), discussed above in reference to FIG. 1A. In one or more embodiments of the invention, one or more of the steps shown in FIG. 2 may be omitted, repeated, and/or performed in parallel, or in a different order than the order shown in FIG. 2. Accordingly, the scope of the invention should not be considered limited to the specific arrangement of steps shown in FIG. 2.

Initially, in Step 202, interactions between users and items are obtained. For example, the recommendation engine may obtain the interactions from a repository (e.g., a repository of an electronic commerce system) that records the items interacted with by various users. One of the users is a target user for which the recommendation engine may recommend an item (see description of Step 210 below).

In Step 204, an edge weight for each edge in a bipartite graph is calculated using an inverse of the degree of a user node connected to the edge and an inverse of the degree of an item node connected to the edge. In one or more embodiments, the recommendation engine calculates the edge weight as the interaction strength of the interaction corresponding to the edge, multiplied by the inverse of the degree of the user node connected to the edge and the inverse of the degree of the item node connected to the edge. Multiplying by the inverses of the degrees of the nodes connected to the edge proportionally reduces the edge weight by the popularity of the nodes connected to the edge, thus reducing any popularity bias associated with the nodes connected to the edge. In other words, multiplying by the inverses of the degrees of the nodes connected to the edge has the effect of de-biasing the nodes connected to the edge.

For example, the edge weight for an edge connecting user node u and item node i may be calculated by the following edge weight formula:

$$\text{edge weight}(u,i) = \text{interaction strength}/(\sqrt{(\text{degree}(u))} * \sqrt{(\text{degree}(i))}).$$

In Step 206, paths are identified in the bipartite graph. Each path may include:

i.) an edge connecting a target user node and a common item node. The target user node corresponds to the target user;
ii.) an edge connecting a neighboring user node and the common item node. That is, both the target user and a neighboring user corresponding to a neighboring user node have interacted with the common item; and/or
iii.) an edge connecting the neighboring user node and a neighboring item node.

The endpoints of the edge are the target user node and the neighboring item node, and the interior points of the edge are the common item node and the neighboring user node. In one or more embodiments, the target user node is not connected to the neighboring item node by any edge. Each path may correspond to a potential interaction between the target user and a neighboring item corresponding to the neighboring item node.

In Step 208, scores are calculated for each path using the edge weights calculated for the edges. In one or more embodiments, the recommendation engine calculates the score for a path by multiplying the edge weights calculated in Step 204 above for the edges in the path. For example, multiplying the edge weights yields the following scoring formula, which is based on the proportion of relevant interactions rather than the raw number of interactions:

$$\text{score} = 1/(\sqrt{(\text{degree}(u_1) \times \text{degree}(i_1) \times \text{degree}(u_2)} \times \sqrt{(\text{degree}(i_2))}),$$

where $u_1$ is the target user node, $i_1$ is the common item node, $u_2$ is the neighboring user node, and $i_2$ is the neighboring item node. Because the first term of the scoring formula, $\sqrt{(\text{degree }(u_1))}$, is constant for a single user (i.e., the target user), the first term may be omitted.

In one or more embodiments, the recommendation engine further de-biases each score by multiplying the score by a de-biasing factor corresponding to the common item node and/or the neighboring user node. The de-biasing factor may include one or both of the following:

i.) the inverse of the maximum score of any path that includes the common item node as an endpoint; and/or
ii.) the inverse of the maximum score of any path that includes the neighboring user node as an endpoint.

Thus, the de-biasing factor reflects the respective prevalence of the common item node and/or the neighboring user node in the paths of the bipartite graph.

The recommendation engine may efficiently calculate the score for each path using a user/item matrix A whose dimensions are |U| and |I|, where |U| is the number of users and |I| is the number of items. If user i interacted with item j, then each cell of the matrix, $A_{ij}$, holds the edge weight of the edge connecting the nodes corresponding to user i and item j, otherwise $A_{ij}$ is zero. The recommendation engine may calculate the score matrix using the following matrix multiplication formula:

$$S = A \times A^T \times A, \text{ where } A^T \text{ is the transpose of } A, \text{ and } S \text{ is a score matrix.}$$

Figure 3:
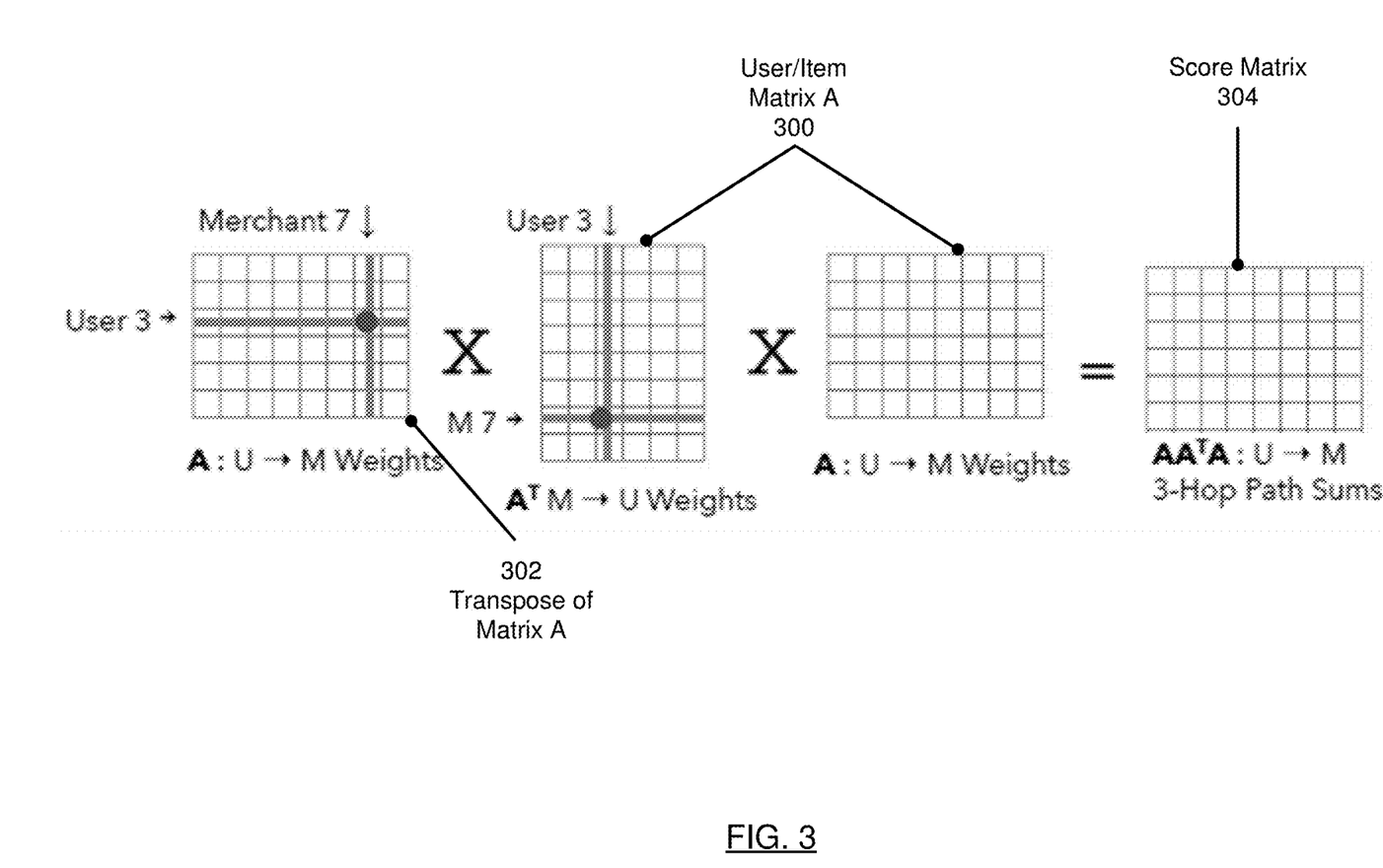
FIG. 3, FIG. 4A, and FIG. 4B show examples in accordance with one or more embodiments of the invention.

FIG. 3 illustrates the multiplication of a user/item matrix A (300) and the transpose of matrix A (302) to generate the score matrix (304) in accordance with the above matrix multiplication formula. In one or more embodiments, there are three terms in the matrix multiplication formula because each path includes three edges. Alternatively, if each path includes additional edges connecting additional user nodes and item nodes (e.g., if each path includes 5 edges, or 7 edges, etc.), then the matrix multiplication formula may include additional terms corresponding to the additional edges.

The computational complexity for calculating scores may be either $O(|U|^2 * |I|)$ or $O(|U| * |I|^2)$, depending on the order in which the recommendation engine performs the matrix multiplications. In many scenarios, |U| is much larger than |I|, and a large random sample of users may reveal trends similar to the overall user population. For this reason, if |U| is very large, the recommendation engine may sample a fraction of the user population in order to reduce computational overhead while achieving similar results.

In one or more embodiments, the matrix multiplication formula is extended to include terms corresponding to user features and/or item features. For example, the extended matrix multiplication formula may calculate higher scores for paths that include nodes corresponding to users and/or items with correlated and/or similar features. Continuing this example, the recommendation engine may determine the similarity between features using feature similarity metrics corresponding to the features. The recommendation engine may calculate a user feature-based score matrix using the following user feature matrix multiplication formula:

$$S_u = ((A \times A^T) \cdot ((F_u = F_u^T) \times A, \text{ where } F_u \text{ is a} |U| \times N_u$$
matrix with $N_u$ features for each user.

Similarly, the recommendation engine may calculate an item feature matrix using the following item feature matrix multiplication formula:

$$S_i = ((A \times A^T) \cdot ((F_i \times F_i^T) \times A, \text{ where } F_i \text{ is a} |I| \times N_i \text{ matrix}$$
with $N_i$ features for each item.

Then, the recommendation engine may combine (e.g., linearly) the scores calculated using the feature matrix multiplications above as in the following extended matrix multiplication formula:

$$S_{extended} = S + k_i * S_i + k_u * S_u, \text{ where } k_i \text{ and } k_u \text{ are weight-}$$
ing factors corresponding to the item features and the user features, respectively.

In one or more embodiments, the recommendation engine constructs a user normalized score matrix and an item normalized score matrix. To construct the item normalized score matrix, the recommendation engine may calculate the average score for paths that includes each item node as an endpoint. The paths that includes the item node as an endpoint are referred to as the item's paths. The recommendation engine may subtract the average score from all scores corresponding to the item's paths, and then divide the result by the standard deviation of the scores for item's paths. The recommendation engine may construct the user normalized score matrix in a similar fashion. The recommendation engine may then combine the user normalized score matrix and the item normalized score matrix by averaging the two matrices into a combined score matrix. This calculation is symmetric relative to users and items, and has been shown empirically to improve accuracy while reducing popularity bias.

In Step 210, a recommended item is recommended to the target user using the scores calculated for the paths. In one or more embodiments, the recommendation engine combines the scores for paths sharing the same endpoints into an aggregate score for the user/item pair corresponding to the user node (e.g., the target user node) and a neighboring item node at the shared endpoints. For example, there may be multiple paths between the target user node a specific neighboring item node, where the multiple paths include various combinations of interior points (e.g., various combinations of common item nodes and/or neighboring user nodes). Continuing this example, the recommendation engine may calculate the aggregate score as the sum of the scores for the paths between the target user node and the neighboring item node. Alternatively, the recommendation engine may apply the machine learning model to calculate the combined score as a nonlinear combination of the scores for the path(s) between the target user node and the neighboring item node. In one or more embodiments, the recommended item corresponds to the neighboring item node corresponding to the best (e.g., largest) aggregate score for the target user/neighboring item pair. The aggregate score may be interpreted as a measure of the strength of the recommendation of the neighboring item to the target user.

In Step 212, an explanation for recommending the recommended item is generated. The recommendation engine may generate the explanation using the paths between the target user node and the recommended item node (i.e., the paths whose endpoints are the target user node and the recommended item node). The recommendation engine may first identify the common item nodes that are interior points included in the paths between the target user node and the recommended item node. The recommendation engine may then generate an explanation that includes the common items corresponding to the identified common item nodes. The explanation may also include numerical values indicating the contribution of each common item to the recommendation. For example, the numerical values may be based on the edge weights of the edges connected to the common item node(s) in the path(s) between the target user node and the recommended item node. The explanation may further include a ranking of the contributions of each common item to the recommendation based on the numerical values corresponding to the common items.

In one or more embodiments, the numerical values for the common items may be calculated using the dot product of the row corresponding to the target user in the user/item matrix A described in Step 208 above and the column corresponding to the recommended item in the matrix resulting from multiplying $A^T$ by A. For example, the terms added together in the dot product may correspond to the edge weights of the edges connected to the interior points (e.g., the common item nodes) in the paths between the target user node and the recommended item node.

In one or more embodiments, the recommendation engine initiates, for the target user, an action to acquire the recommended item. For example, if the item is a product or service, the recommendation engine may display, in a graphical user interface (GUI), a link to a website where the item may be purchased. Alternatively, if the item is a merchant, the recommendation engine may display, in a GUI, a link to a website of the merchant.

Figure 4A:
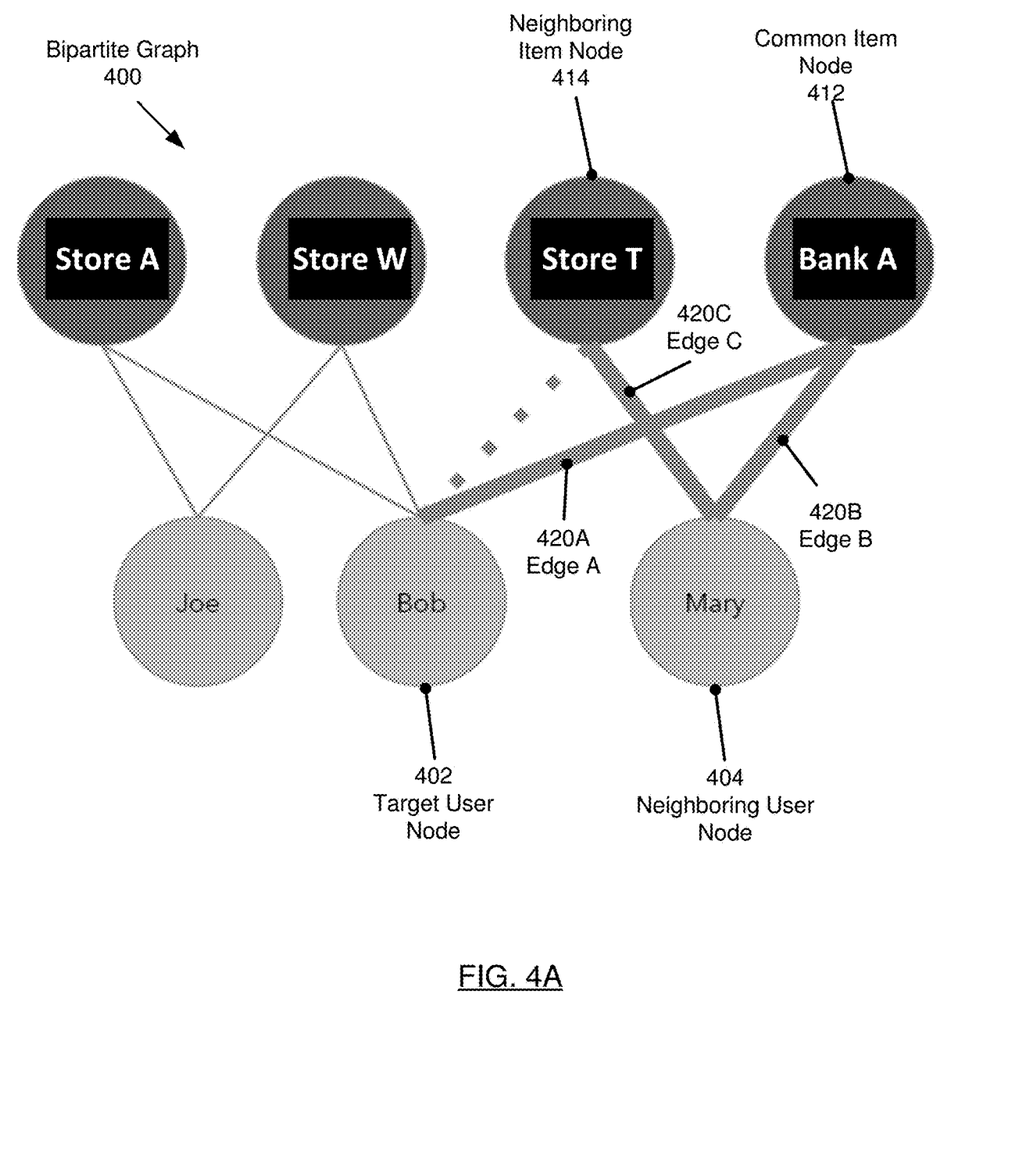
Figure 4B:
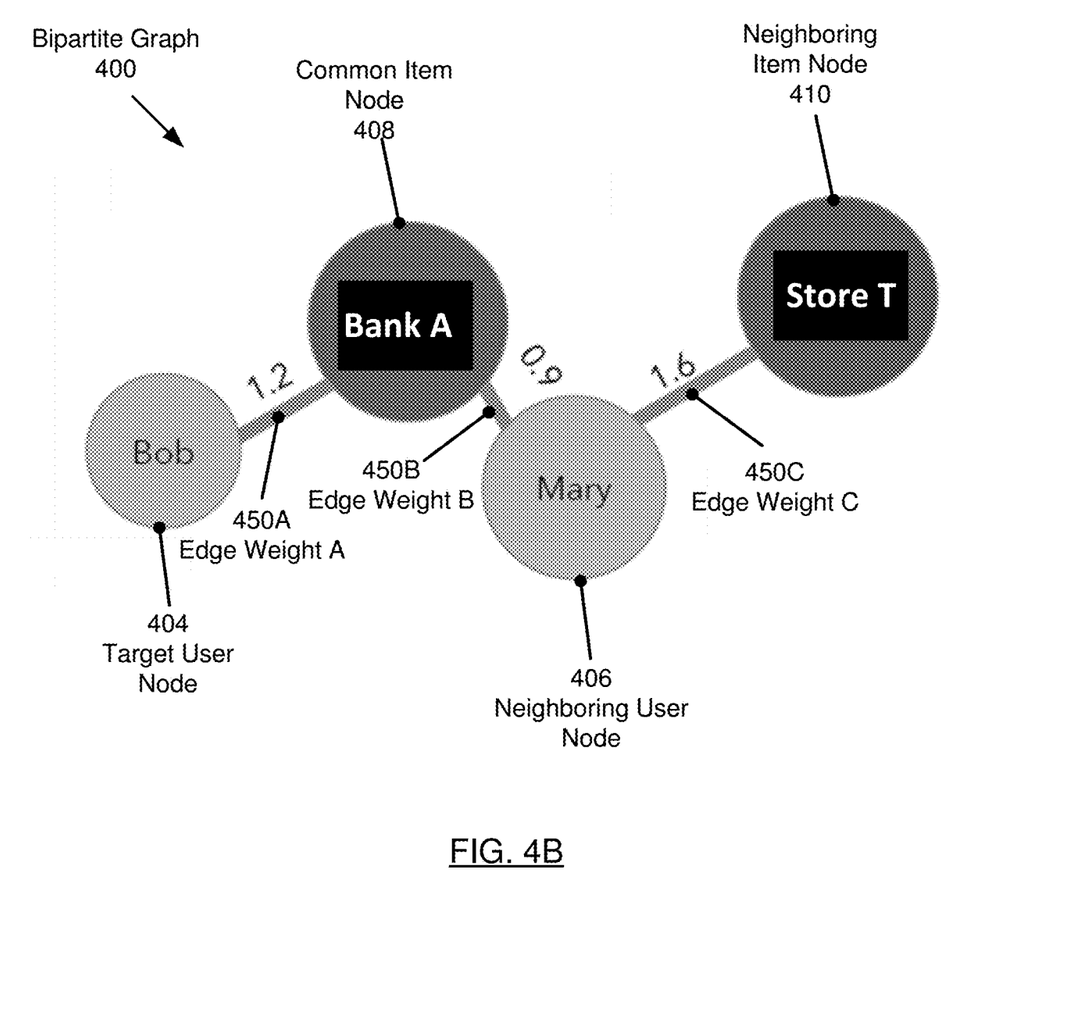

The following example is for explanatory purposes only and not intended to limit the scope of the invention. FIG. 4A and FIG. 4B show implementation examples in accordance with one or more embodiments of the invention. FIG. 4A shows a bipartite graph (400) ((110) in FIG. 1A and FIG. 1B) that includes a target user node (402) ((152) in FIG. 1B), a neighboring user node (404) ((154A, 154B) in FIG. 1B), a common item node (412) ((162) in FIG. 1B), a neighboring item node (414) ((164) in FIG. 1B), and edges (420A, 420B, 420C) ((170) in FIG. 1B).

The recommendation engine generates the item "Store T" corresponding to the neighboring item node (414) as a recommended item for "Bob", the target user corresponding to the target user node (402), as indicated by the dotted line in FIG. 4A. The recommendation is based on the path between the target user node (402) and the neighboring item node (414) that includes edge A (420A), edge B (420B), and edge C (420C). Edge A (420A) and edge B (420B) indicate that the target user "Bob" and a neighboring user "Mary" both interact with a common item "Bank A." In addition, edge C (420C) indicates that the neighboring user "Mary" also interacts with a neighboring item "Store T" that the target user "Bob" does not interact with. The recommendation engine knows that the target user "Bob" does not interact with the neighboring item "Store T" because there is no single edge directly connecting the target user node (402) and the neighboring item node (414).

The strength of the recommendation is based on the edge weights for the edges (420A, 420B, 420C). FIG. 4B shows the edge weights (450A, 450B, 450C) for the edges (420A, 420B, 420C). The recommendation engine multiplies the edge weights (450A, 450B, 450C) to calculate a score of 1.728 for the path that includes the edges (420A, 420B, 420C). The recommendation engine provides, to the target user "Bob", an explanation indicating that the recommendation was based on other users who, like Bob, interacted with the item "Bank A", and also interacted with the item "Store T".

Figure 5A:
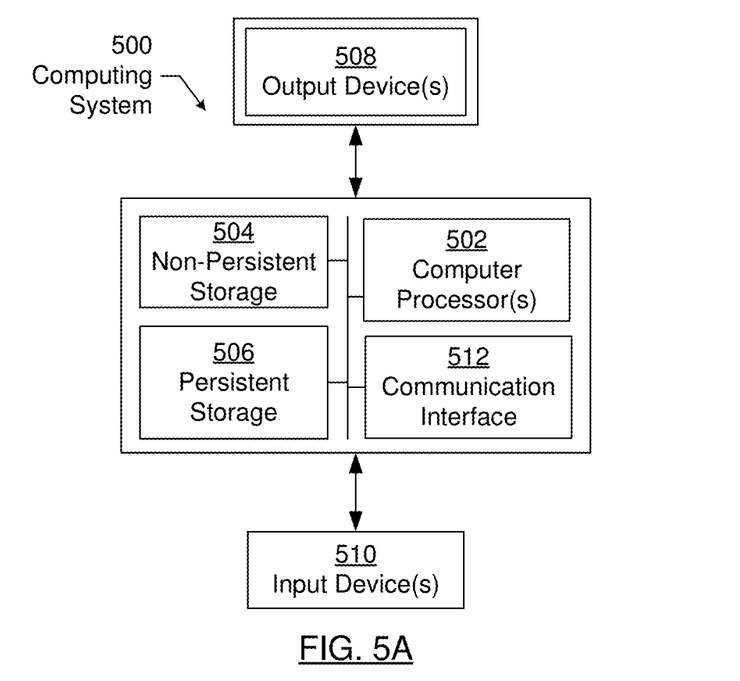
FIG. 5A and FIG. 5B show computing systems in accordance with one or more embodiments of the invention.

Embodiments of the invention may be implemented on a computing system. Any combination of mobile, desktop, server, router, switch, embedded device, or other types of hardware may be used. For example, as shown in FIG. 5A, the computing system (500) may include one or more computer processors (502), non-persistent storage (504) (e.g., volatile memory, such as random access memory (RAM), cache memory), persistent storage (506) (e.g., a hard disk, an optical drive such as a compact disk (CD) drive or digital versatile disk (DVD) drive, a flash memory, etc.), a communication interface (512) (e.g., Bluetooth interface, infrared interface, network interface, optical interface, etc.), and numerous other elements and functionalities.

The computer processor(s) (502) may be an integrated circuit for processing instructions. For example, the computer processor(s) may be one or more cores or micro-cores of a processor. The computing system (500) may also include one or more input devices (510), such as a touchscreen, keyboard, mouse, microphone, touchpad, electronic pen, or any other type of input device.

The communication interface (512) may include an integrated circuit for connecting the computing system (500) to a network (not shown) (e.g., a local area network (LAN), a wide area network (WAN) such as the Internet, mobile network, or any other type of network) and/or to another device, such as another computing device.

Further, the computing system (500) may include one or more output devices (508), such as a screen (e.g., a liquid crystal display (LCD), a plasma display, touchscreen, cathode ray tube (CRT) monitor, projector, or other display device), a printer, external storage, or any other output device. One or more of the output devices may be the same or different from the input device(s). The input and output device(s) may be locally or remotely connected to the computer processor(s) (502), non-persistent storage (504), and persistent storage (506). Many different types of computing systems exist, and the aforementioned input and output device(s) may take other forms.

Software instructions in the form of computer readable program code to perform embodiments of the invention may be stored, in whole or in part, temporarily or permanently, on a non-transitory computer readable medium such as a CD, DVD, storage device, a diskette, a tape, flash memory, physical memory, or any other computer readable storage medium. Specifically, the software instructions may correspond to computer readable program code that, when executed by a processor(s), is configured to perform one or more embodiments of the invention.

Figure 5B:
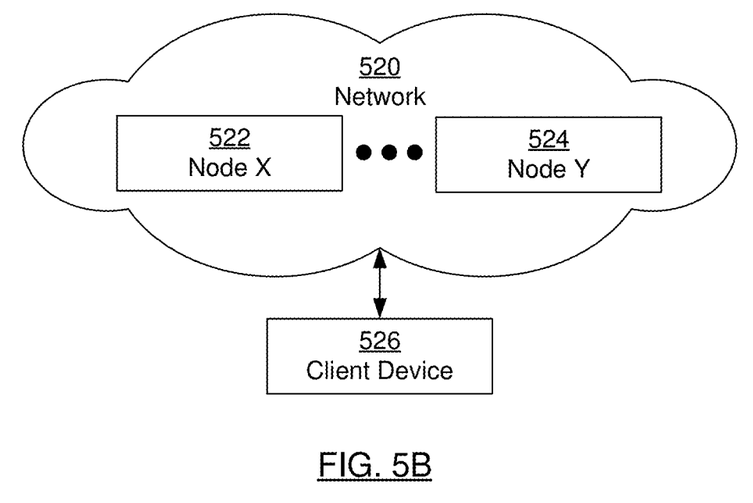

The computing system (500) in FIG. 5A may be connected to or be a part of a network. For example, as shown in FIG. 5B, the network (520) may include multiple nodes (e.g., node X (522), node Y (524)). Each node may correspond to a computing system, such as the computing system shown in FIG. 5A, or a group of nodes combined may correspond to the computing system shown in FIG. 5A. By way of an example, embodiments of the invention may be implemented on a node of a distributed system that is connected to other nodes. By way of another example, embodiments of the invention may be implemented on a distributed computing system having multiple nodes, where each portion of the invention may be located on a different node within the distributed computing system. Further, one or more elements of the aforementioned computing system (500) may be located at a remote location and connected to the other elements over a network.

Although not shown in FIG. 5B, the node may correspond to a blade in a server chassis that is connected to other nodes via a backplane. By way of another example, the node may correspond to a server in a data center. By way of another example, the node may correspond to a computer processor or micro-core of a computer processor with shared memory and/or resources.

The nodes (e.g., node X (522), node Y (524)) in the network (520) may be configured to provide services for a client device (526). For example, the nodes may be part of a cloud computing system. The nodes may include functionality to receive requests from the client device (526) and transmit responses to the client device (526). The client device (526) may be a computing system, such as the computing system shown in FIG. 5A. Further, the client device (526) may include and/or perform all or a portion of one or more embodiments of the invention.

The computing system or group of computing systems described in FIGS. 5A and 5B may include functionality to perform a variety of operations disclosed herein. For example, the computing system(s) may perform communication between processes on the same or different system. A variety of mechanisms, employing some form of active or passive communication, may facilitate the exchange of data between processes on the same device. Examples representative of these inter-process communications include, but are not limited to, the implementation of a file, a signal, a socket, a message queue, a pipeline, a semaphore, shared memory, message passing, and a memory-mapped file. Further details pertaining to a couple of these non-limiting examples are provided below.

Based on the client-server networking model, sockets may serve as interfaces or communication channel endpoints enabling bidirectional data transfer between processes on the same device. Foremost, following the client-server networking model, a server process (e.g., a process that provides data) may create a first socket object. Next, the server process binds the first socket object, thereby associating the first socket object with a unique name and/or address. After creating and binding the first socket object, the server process then waits and listens for incoming connection requests from one or more client processes (e.g., processes that seek data). At this point, when a client process wishes to obtain data from a server process, the client process starts by creating a second socket object. The client process then proceeds to generate a connection request that includes at least the second socket object and the unique name and/or address associated with the first socket object. The client process then transmits the connection request to the server process. Depending on availability, the server process may accept the connection request, establishing a communication channel with the client process, or the server process, busy in handling other operations, may queue the connection request in a buffer until server process is ready. An established connection informs the client process that communications may commence. In response, the client process may generate a data request specifying the data that the client process wishes to obtain. The data request is subsequently transmitted to the server process. Upon receiving the data request, the server process analyzes the request and gathers the requested data. Finally, the server process then generates a reply including at least the requested data and transmits the reply to the client process. The data may be transferred, more commonly, as datagrams or a stream of characters (e.g., bytes).

Shared memory refers to the allocation of virtual memory space in order to substantiate a mechanism for which data may be communicated and/or accessed by multiple processes. In implementing shared memory, an initializing process first creates a shareable segment in persistent or non-persistent storage. Post creation, the initializing process then mounts the shareable segment, subsequently mapping the shareable segment into the address space associated with the initializing process. Following the mounting, the initializing process proceeds to identify and grant access permission to one or more authorized processes that may also write and read data to and from the shareable segment. Changes made to the data in the shareable segment by one process may immediately affect other processes, which are also linked to the shareable segment. Further, when one of the authorized processes accesses the shareable segment, the shareable segment maps to the address space of that authorized process. Often, only one authorized process may mount the shareable segment, other than the initializing process, at any given time.

Other techniques may be used to share data, such as the various data described in the present application, between processes without departing from the scope of the invention. The processes may be part of the same or different application and may execute on the same or different computing system.

Rather than or in addition to sharing data between processes, the computing system performing one or more embodiments of the invention may include functionality to receive data from a user. For example, in one or more embodiments, a user may submit data via a graphical user interface (GUI) on the user device. Data may be submitted via the graphical user interface by a user selecting one or more graphical user interface widgets or inserting text and other data into graphical user interface widgets using a touchpad, a keyboard, a mouse, or any other input device. In response to selecting a particular item, information regarding the particular item may be obtained from persistent or non-persistent storage by the computer processor. Upon selection of the item by the user, the contents of the obtained data regarding the particular item may be displayed on the user device in response to the user's selection.

By way of another example, a request to obtain data regarding the particular item may be sent to a server operatively connected to the user device through a network. For example, the user may select a uniform resource locator (URL) link within a web client of the user device, thereby initiating a Hypertext Transfer Protocol (HTTP) or other protocol request being sent to the network host associated with the URL. In response to the request, the server may extract the data regarding the particular selected item and send the data to the device that initiated the request. Once the user device has received the data regarding the particular item, the contents of the received data regarding the particular item may be displayed on the user device in response to the user's selection. Further to the above example, the data received from the server after selecting the URL link may provide a web page in Hyper Text Markup Language (HTML) that may be rendered by the web client and displayed on the user device.

Once data is obtained, such as by using techniques described above or from storage, the computing system, in performing one or more embodiments of the invention, may extract one or more data items from the obtained data. For example, the extraction may be performed as follows by the computing system in FIG. 5A. First, the organizing pattern (e.g., grammar, schema, layout) of the data is determined, which may be based on one or more of the following: position (e.g., bit or column position, Nth token in a data stream, etc.), attribute (where the attribute is associated with one or more values), or a hierarchical/tree structure (consisting of layers of nodes at different levels of detail-such as in nested packet headers or nested document sections). Then, the raw, unprocessed stream of data symbols is parsed, in the context of the organizing pattern, into a stream (or layered structure) of tokens (where each token may have an associated token "type").

Next, extraction criteria are used to extract one or more data items from the token stream or structure, where the extraction criteria are processed according to the organizing pattern to extract one or more tokens (or nodes from a layered structure). For position-based data, the token(s) at the position(s) identified by the extraction criteria are extracted. For attribute/value-based data, the token(s) and/or node(s) associated with the attribute(s) satisfying the extraction criteria are extracted. For hierarchical/layered data, the token(s) associated with the node(s) matching the extraction criteria are extracted. The extraction criteria may be as simple as an identifier string or may be a query presented to a structured data repository (where the data repository may be organized according to a database schema or data format, such as XML).

The extracted data may be used for further processing by the computing system. For example, the computing system of FIG. 5A, while performing one or more embodiments of the invention, may perform data comparison. Data comparison may be used to compare two or more data values (e.g., A, B). For example, one or more embodiments may determine whether A>B, A=B, A !=B, A<B, etc. The comparison may be performed by submitting A, B, and an opcode specifying an operation related to the comparison into an arithmetic logic unit (ALU) (i.e., circuitry that performs arithmetic and/or bitwise logical operations on the two data values). The ALU outputs the numerical result of the operation and/or one or more status flags related to the numerical result. For example, the status flags may indicate whether the numerical result is a positive number, a negative number, zero, etc. By selecting the proper opcode and then reading the numerical results and/or status flags, the comparison may be executed. For example, in order to determine if A>B, B may be subtracted from A (i.e., A−B), and the status flags may be read to determine if the result is positive (i.e., if A>B, then A−B>0). In one or more embodiments, B may be considered a threshold, and A is deemed to satisfy the threshold if A=B or if A>B, as determined using the ALU. In one or more embodiments of the invention, A and B may be vectors, and comparing A with B requires comparing the first element of vector A with the first element of vector B, the second element of vector A with the second element of vector B, etc. In one or more embodiments, if A and B are strings, the binary values of the strings may be compared.

The computing system in FIG. 5A may implement and/or be connected to a data repository. For example, one type of data repository is a database. A database is a collection of information configured for ease of data retrieval, modification, re-organization, and deletion. Database Management System (DBMS) is a software application that provides an interface for users to define, create, query, update, or administer databases.

The user, or software application, may submit a statement or query into the DBMS. Then the DBMS interprets the statement. The statement may be a select statement to request information, update statement, create statement, delete statement, etc. Moreover, the statement may include parameters that specify data, or data container (database, table, record, column, view, etc.), identifier(s), conditions (comparison operators), functions (e.g. join, full join, count, average, etc.), sort (e.g. ascending, descending), or others. The DBMS may execute the statement. For example, the DBMS may access a memory buffer, a reference or index a file for read, write, deletion, or any combination thereof, for responding to the statement. The DBMS may load the data from persistent or non-persistent storage and perform computations to respond to the query. The DBMS may return the result(s) to the user or software application.

The computing system of FIG. 5A may include functionality to present raw and/or processed data, such as results of comparisons and other processing. For example, presenting data may be accomplished through various presenting methods. Specifically, data may be presented through a user interface provided by a computing device. The user interface may include a GUI that displays information on a display device, such as a computer monitor or a touchscreen on a handheld computer device. The GUI may include various GUI widgets that organize what data is shown as well as how data is presented to a user. Furthermore, the GUI may present data directly to the user, e.g., data presented as actual data values through text, or rendered by the computing device into a visual representation of the data, such as through visualizing a data model.

For example, a GUI may first obtain a notification from a software application requesting that a particular data object be presented within the GUI. Next, the GUI may determine a data object type associated with the particular data object, e.g., by obtaining data from a data attribute within the data object that identifies the data object type. Then, the GUI may determine any rules designated for displaying that data object type, e.g., rules specified by a software framework for a data object class or according to any local parameters defined by the GUI for presenting that data object type. Finally, the GUI may obtain data values from the particular data object and render a visual representation of the data values within a display device according to the designated rules for that data object type.

Data may also be presented through various audio methods. In particular, data may be rendered into an audio format and presented as sound through one or more speakers operably connected to a computing device.

Data may also be presented to a user through haptic methods. For example, haptic methods may include vibrations or other physical signals generated by the computing system. For example, data may be presented to a user using a vibration generated by a handheld computer device with a predefined duration and intensity of the vibration to communicate the data.

The above description of functions present only a few examples of functions performed by the computing system of FIG. 5A and the nodes and/or client device in FIG. 5B. Other functions may be performed using one or more embodiments of the invention.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. A method comprising:
obtaining a plurality of interactions between a plurality of users and a plurality of items, wherein the plurality of users comprises a target user;
calculating, for each edge of a plurality of edges in a bipartite graph, an edge weight using an inverse of the degree of a user node connected to the edge and an inverse of the degree of an item node connected to the edge,
wherein the bipartite graph comprises:
a plurality of user nodes corresponding to the plurality of users, and
a plurality of item nodes corresponding to the plurality of items, and
wherein the plurality of user nodes comprises a target user node corresponding to the target user;
identifying, in the bipartite graph, a plurality of paths each comprising:
an edge connecting the target user node and a common item node of the plurality of item nodes,
an edge connecting a neighboring user node of the plurality of user nodes and the common item node, and
an edge connecting the neighboring user node and a neighboring item node of the plurality of item nodes,
wherein the target user node is not directly connected to the neighboring item node by a single edge;
calculating, using the edge weights calculated for the plurality of edges, a plurality of scores for the plurality of paths;
de-biasing each score of the plurality of scores by dividing the score by a de-biasing factor comprising:
a first maximum score corresponding to the neighboring user node, and
a second maximum score corresponding to the common item node; and
recommending, to the target user and using the plurality of scores for the plurality of paths, a recommended item of the plurality of items.

2. The method of claim 1, wherein the recommended item corresponds to a neighboring item node in one or more paths of the plurality of paths, the method further comprising:
identifying one or more common item nodes in the one or more paths; and
generating an explanation for recommending the recommended item to the target user, wherein the explanation comprises a subset of the plurality of items corresponding to the one or more common item nodes.

3. The method of claim 1, wherein the plurality of scores is calculated by a trained machine learning model.

4. The method of claim 1,
wherein the first maximum score is a maximum score calculated for any path in the bipartite graph that comprises the neighboring user node as an endpoint, and
wherein the second maximum score is a maximum score calculated for any path in the bipartite graph that comprises the common item node as an endpoint.

5. The method of claim 1,
wherein each of the plurality of users corresponds to one or more user features,
wherein each of the plurality of items corresponds to one or more item features,
wherein the neighboring user node corresponds to a neighboring user of the plurality of users, and
wherein calculating the plurality of scores further comprises:
calculating, for each path of the plurality of paths:
a user feature correlation between the one or more user features of the target user and the one or more user features of the neighboring user, and
an item feature correlation between the one or more item features of the common item and the one or more item features of the recommended item,
wherein the score corresponding to the path is further based on the user feature correlation and the item feature correlation.

6. The method of claim 5, wherein the user feature correlation and the item feature correlation are calculated by a trained machine learning model.

7. The method of claim 1, further comprising:
initiating, for the target user, an action to acquire the recommended item.

8. A system comprising:
a computer processor;
a repository storing:
a plurality of interactions between a plurality of users and a plurality of items, wherein the plurality of users comprises a target user, and
a bipartite graph comprising:
a plurality of user nodes corresponding to the plurality of users,
a plurality of item nodes corresponding to the plurality of items, and
a plurality of edges each connecting a user node of the plurality of user nodes and an item node of the plurality of item nodes,
wherein the plurality of user nodes comprises a target user node corresponding to the target user; and
a recommendation engine executing on the computer processor and configured to:
calculate, for each edge of the plurality of edges, an edge weight using an inverse of the degree of a user node connected to the edge and an inverse of the degree of an item node connected to the edge,
identify, in the bipartite graph, a plurality of paths each comprising:
an edge connecting the target user node and a common item node of the plurality of item nodes, an edge connecting a neighboring user node of the plurality of user nodes and the common item node, and an edge connecting the neighboring user node and a neighboring item node of the plurality of item nodes, wherein the target user node is not directly connected to the neighboring item node by a single edge, calculate, using the edge weights calculated for the plurality of edges, a plurality of scores for the plurality of paths, de-bias each score of the plurality of scores by dividing the score by a de-biasing factor comprising:
a first maximum score corresponding to the neighboring user node, and
a second maximum score corresponding to the common item node; and recommend, to the target user and using the plurality of scores for the plurality of paths, a recommended item of the plurality of items.

9. The system of claim 8, wherein the recommended item corresponds to a neighboring item node in one or more paths of the plurality of paths, and wherein the recommendation engine is further configured to:
identify one or more common item nodes in the one or more paths, and
generate an explanation for recommending the recommended item to the target user, wherein the explanation comprises a subset of the plurality of items corresponding to the one or more common item nodes.

10. The system of claim 8, further comprising a trained machine learning model, wherein the plurality of scores is calculated by the trained machine learning model.

11. The system of claim 8,
wherein the first maximum score is a maximum score calculated for any path in the bipartite graph that comprises the neighboring user node as an endpoint, and
wherein the second maximum score is a maximum score calculated for any path in the bipartite graph that comprises the common item node as an endpoint.

12. The system of claim 8,
wherein each of the plurality of users corresponds to one or more user features,
wherein each of the plurality of items corresponds to one or more item features,
wherein the neighboring user node corresponds to a neighboring user of the plurality of users, and
wherein calculating the plurality of scores further comprises:
calculating, for each path of the plurality of paths:
a user feature correlation between the one or more user features of the target user and the one or more user features of the neighboring user, and
an item feature correlation between the one or more item features of the common item and the one or more item features of the recommended item,
wherein the score corresponding to the path is further based on the user feature correlation and the item feature correlation.

13. The system of claim 12, further comprising a trained machine learning model, wherein the user feature correlation and the item feature correlation are calculated by the trained machine learning model.

14. The system of claim 8, wherein the recommendation engine is further configured to:

initiate, for the target user, an action to acquire the recommended item.

15. A method comprising:
obtaining a plurality of interactions between a plurality of users and a plurality of items, the plurality of users comprising a target user;

calculating, for each edge of a plurality of edges in a bipartite graph, an edge weight using an inverse of the degree of a user node connected to the edge and an inverse of the degree of an item node connected to the edge, wherein the bipartite graph comprises:
a plurality of user nodes corresponding to the plurality of users, and
a plurality of item nodes corresponding to the plurality of items, and
wherein the plurality of user nodes comprises a target user node corresponding to the target user;

identifying, in the bipartite graph, a plurality of paths each comprising:
an edge connecting the target user node and a common item node of the plurality of item nodes,
an edge connecting a neighboring user node of the plurality of user nodes and the common item node, and
an edge connecting the neighboring user node and a neighboring item node of the plurality of item nodes,
wherein the target user node is not directly connected to the neighboring item node by a single edge;

calculating, using the edge weights calculated for the plurality of edges, a plurality of scores for the plurality of paths, wherein calculating the plurality of scores comprises multiplying a first matrix, a transpose of the first matrix, and the first matrix,
wherein the first matrix comprises a row of cells corresponding to the plurality of user nodes,
wherein the first matrix comprises a column of cells corresponding to the plurality of item nodes, and
wherein each cell of the first matrix comprises the edge weight calculated for the edge connecting the user node corresponding to the cell and the item node corresponding to the cell;

de-biasing each score of the plurality of scores by dividing the score by a de-biasing factor comprising:
a first maximum score corresponding to the neighboring user node, and
a second maximum score corresponding to the common item node; and recommending, to the target user and using the plurality of scores for the plurality of paths, a recommended item of the plurality of items.

16. The method of claim 15, wherein the recommended item corresponds to a neighboring item node in one or more paths of the plurality of paths, the method further comprising:
identifying one or more common item nodes in the one or more paths; and
generating an explanation for recommending the recommended item to the target user,
wherein the explanation comprises a subset of the plurality of items corresponding to the one or more common item nodes,
wherein generating the explanation comprises calculating a dot product between the row of the first matrix corresponding to the target user node and the column of a second matrix corresponding to the recommended item node, and wherein the second matrix is the result of multiplying the transpose of the first matrix by the first matrix.

17. The method of claim 15,
wherein each of the plurality of users corresponds to one or more user features, and
wherein calculating the plurality of scores further comprises:
  calculating, for each pair of users in a plurality of pairs of users, a user feature correlation between the one or more user features of each user in the pair, and
  multiplying the first matrix by a second matrix and a transpose of the second matrix,
  wherein the second matrix comprises a plurality of cells each corresponding to a user feature correlation of a pair of users.

18. The method of claim 17, further comprising:
wherein each of the plurality of items corresponds to one or more item features, and
wherein calculating the plurality of scores further comprises:
  calculating, for each pair of items in a plurality of pairs of items, an item feature correlation between the one or more item features of each item in the pair,
  multiplying the first matrix by a third matrix and a transpose of the third matrix, and
  wherein the third matrix comprises a plurality of cells each corresponding to an item feature correlation of a pair of items, and
  combining the second matrix and the third matrix.

19. The method of claim 18, further comprising:
combining the second matrix and the third matrix.

20. The method of claim 15,
wherein the first maximum score is a maximum score calculated for any path in the bipartite graph that comprises the neighboring user node as an endpoint, and
wherein the second maximum score is a maximum score calculated for any path in the bipartite graph that comprises the common item node as an endpoint.

* * * * *